United States Patent [19]

Eastman

[11] 4,293,473

[45] Oct. 6, 1981

[54] POLYVINYL ALCOHOL - CRYSTALLINE SOLVENT SYSTEM BASED COMPOSITIONS MODIFIED WITH ETHYLENE POLYMER

[75] Inventor: Ernest F. Eastman, Wilmington, Del.

[73] Assignee: E. I. Du Pont de Nemours and Company, Wilmington, Del.

[21] Appl. No.: 172,243

[22] Filed: Jul. 25, 1980

[51] Int. Cl.$^3$ .................. C08L 93/00; C08L 93/04
[52] U.S. Cl. .................. 260/27 R; 260/27 EV; 260/30.2; 260/32.6 R; 525/57; 525/60; 525/56
[58] Field of Search .................. 260/32.6 PQ, 32.6 R, 260/30.8 R, 27 EV, 27 R, 31.8 M, 30.2; 525/60, 62, 57, 56

[56] References Cited

U.S. PATENT DOCUMENTS

| | | | |
|---|---|---|---|
| 3,497,487 | 2/1970 | Bristol | 528/486 |
| 3,615,106 | 10/1971 | Flanaban | 260/27 EV |
| 3,654,247 | 4/1972 | Bristol | 525/62 |
| 3,758,431 | 9/1973 | Taft | 260/27 EV |
| 3,780,140 | 12/1973 | Hammer | 260/27 EV |
| 3,882,259 | 5/1975 | Nahara et al. | 525/60 |
| 4,129,539 | 12/1978 | Fakla et al. | 260/27 R |
| 4,131,581 | 12/1978 | Coker | 260/32.6 R |
| 4,140,733 | 2/1979 | Meyer et al. | 260/27 R |

FOREIGN PATENT DOCUMENTS

| | | | |
|---|---|---|---|
| 1878 | 5/1979 | European Pat. Off. | 260/27 R |
| 2396790 | 3/1979 | France | 525/60 |

OTHER PUBLICATIONS

Derwent Abst. 57508, (French 2396790 enclosed), "Polyvinyl Alcohol Adhesive Comp. Containing Solid Solvent, Diluent, Filler, " 3-9-79, Du Pont.

*Primary Examiner*—Paul Lieberman
*Assistant Examiner*—Herbert J. Lilling

[57] ABSTRACT

Solid adhesive compositions consisting essentially of polyvinyl alcohol or ethylene/vinyl alcohol copolymer, and at least two component crystalline solvent system (such as urea and ε-caprolactam), ethylene polymer and optionally thermoplastic tackifier and carboxylic acid are disclosed. Outstanding adhesive properties with cellulosics, spun bonded polyolefins, aluminum foil and polyester film substrates have been obtained.

15 Claims, No Drawings

POLYVINYL ALCOHOL - CRYSTALLINE SOLVENT SYSTEM BASED COMPOSITIONS MODIFIED WITH ETHYLENE POLYMER

BACKGROUND OF THE INVENTION

1. Field of the Invention

This invention relates to polyvinyl alcohol-based compositions and more particularly it relates to adhesives containing polyvinyl alcohol or ethylene/vinyl alcohol copolymer, a crystalline solvent system and ethylene polymer.

2. Description of the Prior Art

U.S. Pat. No. 4,131,581 discloses adhesives consisting essentially of polyvinyl alcohol or ethylene/vinyl alcohol copolymer, a crystalline solvent for the polymer component (such as urea, thiourea, acetamide, $\epsilon$-caprolactam, etc.) and a viscosity reducing diluent (such as water, glycols, etc.). The adhesives are disclosed to be particularly suitable for cellulosic substrates providing excellent ambient temperature resistance while being fully repulpable in hot water.

SUMMARY OF THE INVENTION

According to the present invention there is provided a solid adhesive composition consisting essentially of (1) from about 2 to about 35 percent by weight of a vinyl alcohol polymer selected from the group consisting of polyvinyl alcohol and ethylene/vinyl alcohol copolymers containing at least 50 mole percent vinyl alcohol; (2) from about 10 to about 80 percent by weight of an at least two component crystalline solvent system wherein component (a) is selected from the group consisting of urea, solid alkyl substituted ureas containing a total of up to 9 carbon atoms, thiourea, biuret, and solid aliphatic amides containing up to 6 carbon atoms, and component (b) is $\epsilon$-caprolactam, the ratio of component (a) to component (b) being from about 80/20 to about 20/80; (3) from about 1 to about 15 percent by weight of at least one ethylene polymer selected from the group consisting of ethylene homopolymer, ethylene copolymers with vinyl esters, acrylates, and methacrylates and their terpolymers with carbon monoxide and their terpolymers with acids selected from the group consisting of acrylic acid and methacrylic acid, provided that when said ethylene polymer is ethylene homopolymer it is present in an amount of up to about 5 percent by weight; (4) from 0 to about 15 percent by weight of thermoplastic tackifier and (5) from 0 to about 5 percent by weight of carboxylic acid.

In the context of the present invention the phrase "consisting essentially of" means that the named ingredients (except where indicated to be optional) are essential, however, other ingredients which do not prevent the advantages of the present invention from being realized can also be included.

DETAILED DESCRIPTION OF THE INVENTION

A new class of solid polyvinyl alcohol/crystalline solvent based adhesive compositions has been discovered. Heretofore, conventional polyvinyl alcohol/crystalline solvent hot-melt-type adhesive compositions have contained a volatile, liquid diluent, e.g., either water or glycol (cf. U.S. Pat. No. 4,131,581). Presence of the diluent contributed to melt instability, sensitivity of bonded structures to high humidity and restricted use to cellulosic substrates. It has been found that the omission of the diluent coupled with use of urea and $\epsilon$-caprolactam as co-crystalline solvents allows incorporation of ethylene polymers into the PVA/crystalline solvent matrix resulting in compatible 100% solids adhesive compositions. It has also been found that these new compositions can be further modified by use of either conventional hot melt adhesive thermoplastic resins (tackifiers) or carboxylic acids, or both. The result is a broad range of new adhesive formulations with a potentially broader adhesive capability than conventional polyvinyl alcohol/crystalline solvent/diluent compositions.

The number of polyvinyl alcohol/crystalline solvent/diluent hot-melt-type adhesive compositions of the prior art, which actually can be considered for practical commercial use, are relatively small. Elimination of the diluent and the ability to incorporate ethylene polymers and tackifiers, coupled with the choice to use a carboxylic acid, establishes an almost limitless number of options for formulating a viable adhesive composition. Elimination of diluent also removes a major negative factor contributing to thermal instability of conventional PVA/crystalline solvent/diluent systems.

The adhesive compositions of the present invention can be prepared by blending the ingredients at a temperature of from about 130° C. to about 175° C., preferably from about 145° to about 150° C. for a period of from about 30 to about 100 minutes, preferably from about 60 to about 90 minutes, in a batch process.

The vinyl alcohol polymer suitable for the present invention can be polyvinyl alcohol (PVA) or ethylene/vinyl alcohol (E/VOH) copolymer containing at least 50 mole percent vinyl alcohol. All commercial grades of polyvinyl alcohol can be employed as the blend component. These grades include both completely hydrolyzed (i.e., about 99 percent or higher) and partially hydrolyzed (about 88 percent) types covering a degree of polymerization (DP) range of about 300–2000 (number average basis), as well as fully hydrolyzed copolymers of polyvinyl alcohol (including those containing about 4 percent methylmethacrylate comonomer) of similar DP range. The viscosity, measured at 20° C., using a 4 percent aqueous solution of polyvinyl alcohol suitable in the compositions of the present invention, ranges from about 4 to about 65 cps. Preferably the viscosity should be from about 10 to about 55 cps.

The polyvinyl alcohol preferred as a component in the adhesive of the present invention is a 99 percent or higher hydrolyzed grade with a DP of about 800 and a 4 percent aqueous viscosity (20° C.) of 12–14 cps.

The amount of polyvinyl alcohol or E/VOH copolymer in the composition of the present invention can range from about 2 to about 35 percent by weight.

The components of the crystalline solvent system for the composition of the present invention must satisfy the following requirements:

(1) They must be crystalline at 40° C.,
(2) They must function as solvent for the vinyl alcohol polymer, i.e., dissolve at least 5 weight percent of the latter at or above the melting point of the crystalline solvent component.

The following compounds were found to satisfy these conditions: (1) urea; solid alkyl substituted ureas containing a total of up to 9 carbon atoms, such as methyl urea (m.p. 90° C.–98° C.), ethyl urea (m.p. 92° C.), 1,1-diethyl urea (m.p. 112° C.); thiourea; biuret, and $\epsilon$-caprolactam; and (2) solid aliphatic amides containing up to 6 carbon atoms such as acetamide, propionamide, butyramide. In the above context "solid" means that the specified compound is in the solid state at 20° C.

Urea is the most preferred choice for component (a) of the crystalline solvent system primarily because of its less hygroscopic nature and because its melting point (132° C.) falls within the preferred range of 75° C.–175° C. Thiourea is also preferred although it has a tendency to corrode stainless steel equipment.

Component (b) of the crystalline solvent system is $\epsilon$-caprolactam.

The crystalline solvent system should be present in the adhesive composition of the present invention in an amount of from about 10 to about 80 percent by weight. Below this range the products tend to be too viscous and have poor "tack" while concentrations above 80 percent have a detrimental effect on the ambient temperature water resistance of the obtainable bonds. Preferably the amount of the two component crystalline solvent system should be from about 40 to about 70 percent by weight.

The two compounds, component (a) and component (b), that will be used most frequently as co-crystalline solvents, are urea and $\epsilon$-caprolactam, respectively. Accordingly, the present invention will be discussed in terms of these compounds. Neither one alone would be satisfactory as the crystalline solvent. Generally, the ratio of urea/$\epsilon$-caprolactam for preparing useful compositions would be from about 80/20 to about 20/80. The preferred ratio, based upon the optimum characteristics obtained and economics, is from about 65/35 to about 50/50 urea/$\epsilon$-caprolactam.

The preferred ratio of vinyl alcohol polymer to two component crystalline solvent system is from about 33/67 to about 25/75, a ratio of from about 30/70 being especially preferred.

Ethylene polymers suitable for use in the present invention can be either the homopolymer of ethylene or co- and terpolymers of ethylene with comonomers such as vinyl esters (e.g., vinyl acetate), acrylates (such as ethyl acrylates), unsaturated carboxylic acids (such as acrylic acid, methacrylic acid) and carbon monoxide.

The amount of ethylene polymer present should be from about 1 to about 15 percent by weight when the polymer is a co- or terpolymer and from about 1 to about 5 percent by weight when the copolymer is a homopolymer of ethylene. Preferably the amount of co- or terpolymers present will be from about 4 to about 12 percent by weight and the amount of homopolymer will be from about 1.5 to about 3.3 percent by weight. The most preferred range for co- or terpolymers is from about 6 to about 9 percent by weight.

The solid adhesive compositions of the present invention can be optionally modified by the inclusion of thermoplastic tackifiers therein. Tackifiers such as glycerol rosin esters (e.g., "Foral" 85, manufactured by Hercules), aromatic resins (e.g., "Piccovar" L-30, manufactured by Hercules), hydrocarbon resins (e.g., "Wingtack" 76, manufactured by Goodyear or "Escorez" 5280, manufactured by Exxon), rosin esters (e.g., "Stabelite Ester" 10, manufactured by Hercules), and disproportionated rosins (e.g., "Acintol" DR-24, manufactured by Arizona Chemical) can be used.

The amount of tackifiers will range from about 0 to about 15 percent by weight, preferably from about 4 to about 12 percent by weight and most preferably from about 6 to about 9 percent by weight. The solid adhesive compositions of the present invention can also be modified optionally by the inclusion of carboxylic acid (e.g., adipic acid) therein. The amount of carboxylic acid present should be from 0 to about 5 percent by weight, preferably from about 0.1 to about 4 percent by weight.

The solid adhesive compositions of the present invention based on polyvinyl alcohol and co-crystalline solvent system of urea and $\epsilon$-caprolactam wherein various ethylene polymers such as E/VA copolymers and E/VA/MA terpolymers, as well as polyethylene resins can be also incorporated, result in new hot melt compositions that can be applied from conventional hot melt adhesive application equipment. They yield fiber tearing bonds with cellulosic substrates and spun bonded polyolefins, as well as giving cohesive bonding to aluminum foil and polyester film.

The following examples are presented to illustrate the present invention. Percentages and parts are by weight unless otherwise stated.

EXAMPLE 1

Ten grams of urea prills (46% nitrogen) and 10 grams of $\epsilon$-caprolactam were charged to a 250 cm$^3$ metal can heated by means of a thermostatically controlled heating clock. After these ingredients melted and their temperature reached 175° C., 10 grams of Elvanol ® 90-50, a fully hydrolyzed (99.0–99.8%) grade of polyvinyl alcohol (4% aqueous viscosity 12–14 mPa.s at 20° C.) was added and stirred by means of a metal rod. When the PVA had dissolved 10 grams of 70/30 ethylene/dimethylamino ethyl methacrylate polymer was added to the molten blend. After a few minutes stirring the finished blend was clear and compatible.

The adhesive capability of the molten blend was tested by preparing a 6 cm$^2$ lap joint with two 2.5×5.0 cm. Kraft paper coupons. The bonded coupons could not be separated without fibers tearing from both sides of the bonded area.

Two grams of adipic acid was added to the still molten blend which remained clear and compatible. Qualitatively the blend appeared more elastomeric after addition of adipic acid.

A lap joint (6 cm$^2$) was prepared, similar to that described above, with the acid modified blend. Fiber tearing bonds were also obtained with this composition.

EXAMPLE 2

Seventy-five grams of urea prills (46% nitrogen) and seventy-five grams of $\epsilon$-caprolactam were charged to a 250 cm$^3$ oil heated Atlantic Helicone Mixer. When the temperature of the melted ingredients was 140° C. a dry physical blend of 75 gm of "Vinol" 107, fully hydrolyzed (99%) polyvinyl alcohol (4% aqueous viscosity of 5–7 mPa.s at 20° C.) manufactured by Air Products and Chemicals, Inc. and 4.65 gms Alathon ® 4352, a medium density (0.930 g/cc) polyethylene resin manufactured by DuPont, was added to the mixer within 1–2 minutes with an agitator setting of 4. After the temperature of the mixing blend reached 145° C.–150° C., (5–7 minutes), mixing was continued for 60 minutes. During the entire mixing cycle the blending mix was clear and compatible.

Before discharging product from the mixer the adhesive capability of the blend was evaluated by preparing a 6 cm$^2$ lap joint with 2.5cm×5.0 cm strips of Tyvek ® spun bonded polyolefin sheet. The bonded coupon could not be separated without tearing fibers from the coupons. After discharge the product was clear and pliable at room temperature.

EXAMPLE 3

Sixty-two grams of urea prills (46% nitrogen) and sixty-two grams of ε-caprolactam were charged to a 250 cm³ oil heated Atlantic Helicone Mixer. When the temperature of the melted ingredients was 140° C. a dry physical blend of sixty-two grams of "Vinol" 107, and fourteen grams of Elvax ® 4260 ethylene/vinyl acetate/methacrylic acid (E/VA/MAA) terpolymer (containing 28% MAA, acid no 4–8 MI=6, manufactured by Du Pont) was charged to the mixer within 1–2 minutes with an agitator setting of 4. After the temperature of the blend reached 145°–150° C. (5–7 minutes) mixing was continued for 60 minutes. During the entire mixing cycle the blend was clear and compatible. After discharge, the product at room temperature was translucent and flexible.

EXAMPLE 4

One hundred six gms of urea and sixty-three grams of ε-caprolactam were charged to a 250 cm³ oil heated Atlantic Helicone Mixer. When these ingredients were melted and at 140° C. a physical mixture of the following was added over 1–2 minute period; seventy-five grams of "Vinol" 107, 20 gms of Elvax ® 210, ethylene/vinyl acetate (E/VA) resin, (28% VA MI=400, manufactured by Du Pont) and 20 g of "Foral" 85. After the temperature of the mixing blend reached 145°–150° C. agitation was continued for 60 minutes, after which it was discharged. When cooled to room temperature the product was translucent and pliable. Just prior to discharge the adhesive capability of the product was tested by preparing a 6 cm² lap joint with 2.5×5.0 cm Kraft coupons. The coupons could not be separated without tearing the coupons.

The melt viscosity of this composition as determined by measurement in a Brookfield Thermosel was 132,000 mPa.s at 275° F. (135° C.).

To demonstrate the effect of adding a carboxylic acid to the adhesive blend, a similar composition was prepared except 2 gms of adipic acid was added to the molten blend 10 minutes before discharge. There was no difference in the physical appearance of the product and comparable fiber tearing bonds could be prepared with Kraft coupon. The Thermosel viscosity of this product was 106,000 mPa.s at 275° F. (135° C.).

EXAMPLES 5–20

These examples illustrate the variety of compositions possible with the combination of ingredients available for use within the technology of the present invention. All preparations were prepared using an Atlantic Helicone Mixer under conditions described in previous examples. Compositions and characteristics are summarized in Table 1.

TABLE I

| Example | PVA[1] | Urea | ε-Capro-Lactam | Adipic Acid | Ethylene Copolymer |
|---|---|---|---|---|---|
| 5 | 75 | 106 | 63 | 2 | 20g Elvax ® 210 |
| 6 | 75 | 106 | 63 | 2 | 20g Elvax ® 210 |
| 7 | 75 | 106 | 63 | — | 20g Elvax ® 210 |
| 8 | 75 | 106 | 63 | — | 20g Elvax ® 210 |
| 9 | 75 | 106 | 63 | 2 | 20g Elvax ® 210 |
| 10 | 75 | 106 | 63 | — | 20g Elvax ® 210 |
| 11 | 75 | 106 | 63 | — | 20g Elvax ® 210 |
| 12 | 75 | 106 | 63 | 2 | 20g Elvax ® 210 |
| 13 | 75 | 106 | 63 | — | 20g Elvax ® 210 |
| 14 | 75 | 106 | 63 | — | 20g Elvax ® 210 |
| 15 | 75 | 106 | 63 | — | 20g Elvax ® 210 |
| 16 | 75 | 106 | 63 | 2 | 20g Elvax ® 210 |
| 17 | 75 | 106 | 63 | 2 | 20g Elvax ® 210 |
| 18 | 75 | 106 | 63 | — | 20g Elvax ® 210 |
| 19 | 75 | 75 | 75 | — | 20g Elvax ® 210 |
| 20 | 75 | 75 | 75 | — | 20g Elvax ® 210 |

| Example | Tackifier | Thermosel Viscosity mPa.s@ 275° F. | Comment |
|---|---|---|---|
| 5 | — | 70,000 | Opaque, F/T[2] Bond |
| 6 | 20g "Piccovar" L-30 | 56,000 | Opaque, F/T Bond |
| 7 | 20g "Piccovar" L-30 | 102,000 | Translucent, F/T Bond |
| 8 | 20g "Foral" 85 | 132,000 | Translucent, F/T Bond |
| 9 | 20g "Foral" 85 | 106,000 | Translucent, F/T Bond |
| 10 | 40g "Wingtack" 76 | 40,000 | Opaque, F/T Bond |
| 11 | 20g "Wingtack" 76 | 116,000 | Pliable, F/T Bond |
| 12 | 20g "Stabelite Ester" 10 | 120,000 | Pliable, F/T Bond |
| 13 | 20g "Stabelite Ester" 10 | 122,000 | Pliable, F/T Bond |
| 14 | 40g "Acintol" DR-24 | 12,000 | Pliable, F/T Bond |
| 15 | 20g "Acintol" DR-24 | 118,000 | Pliable, F/T Bond |
| 16 | 20g "Acintol" Dr-24 | 88,000 | Pliable, F/T Bond |
| 17 | 20g "Escorez" 5280 | 250,000 | Pliable, F/T Bond |
| 18 | 20g "Escorez" 5280 | 130,000 | Pliable, F/T Bond |
| 19 | 20g "Acintol" Dr-24 | 100,000 | Pliable, F/T Bond |
| 20 | 20g "Stabelite Ester" 10 | 60,000 | Pliable, F/T Bond |

[1]"Vinol" 107
[2]F/T = fiber testing

EXAMPLES 21 AND 22

The following examples illustrate (1) the lowest blending temperature required to prepare acceptable product, (2) the lowest urea/ε-caprolactam ratio feasible for the crystalline solvent system and (3) the interchangeability of using either an Elvax ® acid (E/VA/MAA) terpolymer as the ethylene polymer or an Elvax ® (E/VA) copolymer in conjunction with a carboxylic acid. Both preparations were blended in an Atlantic Helicone Mixer at a blending temperature of 135° C. The sequence of steps used was the same as described in previous examples. Both products were very flexible when cooled to room temperature after discharge and formed fiber tearing bonds when 6 cm² lap joints were made with 2.5×5.0 cm Kraft paper coupons.

Blending temperature was 135° C. for 60 minutes. When adipic acid was employed it was added 10 minutes before the end of the blending cycle.

Compositions are summarized in Table II.

TABLE II

| | Example 21 | Example 22 |
|---|---|---|
| PVA, "Vinol" 107, gms | 77.5 | 77.5 |
| Urea, gms | 40 | 40 |
| ε-Caprolactam, gms | 115 | 115 |
| Elvax ® 4260, gms | — | 17.5 |
| Elvax ® 210, gms | 17.5 | — |
| Adipic Acid, gms | 15 | — |

EXAMPLES 23 AND 24

The following compositions were prepared to illustrate the incorporation of ethylene/vinyl acetate/carbon monoxide (E/VA/CO) terpolymer (Elvaloy ® 741, 28% VA, 11% CO, MI=6, manufactured by Du Pont) into a PVA/urea/ε-caprolactam blend. Preparation conditions were similar to those described in previous examples, i.e. 60 minute blending time at 150° C. Products obtained after blending gave fiber tearing bonds when tested with Kraft paper coupons.

Compositions and characteristics are summarized in Table III.

TABLE III

|  | Example 23 | Example 24 |
|---|---|---|
| PVA, "Vinol" 107 gms | 75 | 75 |
| Urea gms | 75 | 75 |
| ε-Caprolactam gms | 75 | 75 |
| Elvaloy ® 741 gms | 15 | 15 |
| "Piccovar" L-30 gms | — | 15 |
| Adipic Acid gms | — | 10 |
| Physical Appearance | Opaque sl. flexible | Translucent flexible |

I claim:

1. Solid adhesive composition consisting essentially of (1) from about 2 to about 35 percent by weight of a vinyl alcohol polymer selected from the group consisting of polyvinyl alcohol and ethylene/vinyl alcohol copolymers containing at least 50 mol percent vinyl alcohol; (2) from about 10 to about 80 percent by weight of an at least two component crystalline solvent system wherein component (a) is selected from the group consisting of urea, solid alkyl substituted ureas containing a total of up to 9 carbon atoms, thiourea, biuret, and solid aliphatic amides containing up to 6 carbon atoms, and component (b) is ε-caprolactam, the ratio of component (a) to component (b) being from about 80/20 to about 20/80; (3) from about 1 to about 15 percent by weight of at least one ethylene polymer selected from the group consisting of ethylene homopolymer and ethylene copolymers with vinyl esters, acrylates, methacrylates and their terpolymers with carbon monoxide, and their terpolymers with acids selected from the group consisting of acrylic acid and methacrylic acid, provided that when said ethylene polymer is ethylene homopolymer it is present in an amount of up to about 5 percent by weight; (4) from 0 to about 15 percent by weight of thermoplastic tackifier; and (5) from 0 to about 5 percent by weight of normally solid, saturated aliphatic carboxylic acid.

2. The composition of claim 1 wherein component (a) is urea.

3. The composition of claim 2 wherein the vinyl alcohol polymer is polyvinyl alcohol.

4. The composition of claim 3 wherein the polyvinyl alcohol/crystalline solvent system ratio is from about 33/67 to about 25/75.

5. The composition of claim 4 wherein the crystalline solvent system is present in an amount of from about 40 to about 70 percent by weight.

6. The composition of claim 5 wherein the ratio of component (a) to component (b) in said crystalline solvent system is from about 65/35 to about 50/50.

7. The composition of claim 6 wherein the polyvinyl alcohol/crystalline solvent system ratio is about 30/70.

8. The composition of claim 6 wherein the ethylene polymer is ethylene homopolymer and it is present in an amount of from about 1.5 to about 3 percent by weight.

9. The composition of claim 6 wherein the ethylene polymer is selected from the group consisting of ethylene copolymers and terpolymers and said ethylene polymer is present in the amount of from about 4 to about 12 percent by weight.

10. The composition of claim 9 wherein the ethylene copolymer is ethylene/vinylacetate copolymer.

11. The composition of claim 9 wherein the ethylene terpolymer is ethylene/vinylacetate/methacrylic acid terpolymer.

12. The composition of claim 9 wherein the ethylene terpolymer is ethylene/vinylacetate/carbon monoxide terpolymer.

13. The composition of claim 7 wherein the ethylene polymer is selected from the group consisting of ethylene copolymers and terpolymers and said ethylene polymer is present in the amount of from about 6 to about 9 percent by weight.

14. The composition of claims 6, 8 or 9 wherein the thermoplastic tackifier is present in the amount of from 4 to about 12 percent by weight.

15. The composition of claims 6, 8 or 9 wherein the carboxylic acid is present in the amount of from about 0.1 to about 4 percent by weight.

* * * * *